United States Patent [19]
Barton et al.

[11] Patent Number: 6,072,970
[45] Date of Patent: Jun. 6, 2000

[54] CHARGE ROLLER

[75] Inventors: William Hargis Barton, Nicholasville; Alan Stirling Campbell; Martin Victor DiGirolamo, both of Lexington; Donald Wayne Stafford, Richmond, all of Ky.

[73] Assignee: Lexmark International, Inc., Lexington, Ky.

[21] Appl. No.: 08/738,649

[22] Filed: Oct. 29, 1996

[51] Int. Cl.$^7$ ................................................. G03G 15/02
[52] U.S. Cl. .................. 399/176; 361/221; 361/225; 361/230; 399/50; 399/117; 399/313; 399/31; 428/34.1; 428/375; 428/379; 428/383; 428/36.9
[58] Field of Search ............................ 428/34.1, 375, 428/379, 383, 36.9; 399/176, 117, 313, 31, 50; 361/225, 221, 230

[56] References Cited

U.S. PATENT DOCUMENTS

| | | | |
|---|---|---|---|
| 2,962,474 | 11/1960 | Fusco et al. | 260/45.8 |
| 3,586,087 | 6/1971 | Messerly et al. | 152/330 |
| 3,876,590 | 4/1975 | Shimogawa et al. | 525/477 |
| 4,048,261 | 9/1977 | Starmer | 525/477 |
| 4,128,510 | 12/1978 | Richwine | 528/36 |
| 4,197,382 | 4/1980 | Fukushima et al. | 525/403 |
| 4,317,265 | 3/1982 | Chase et al. | 29/132 |
| 4,357,446 | 11/1982 | Matoba | 525/281 |
| 4,511,698 | 4/1985 | Matoba et al. | 525/187 |
| 4,556,220 | 12/1985 | Tominaga et al. | 273/218 |
| 4,558,102 | 12/1985 | Miyata et al. | 525/348 |
| 4,624,989 | 11/1986 | Berta | 525/187 |
| 5,209,872 | 5/1993 | Takahashi et al. | 252/511 |
| 5,385,980 | 1/1995 | Schaefer et al. | 525/187 |
| 5,403,419 | 4/1995 | Yoshikawa et al. | 156/151 |
| 5,458,824 | 10/1995 | Powers et al. | 264/474 |
| 5,475,473 | 12/1995 | Masuda et al. | 355/219 |
| 5,497,219 | 3/1996 | Kurokawa et al. | 355/219 |
| 5,499,078 | 3/1996 | Kurokawa et al. | 399/176 |
| 5,550,190 | 8/1996 | Hasegawa et al. | 525/92 A |
| 5,686,537 | 11/1997 | Class | 525/349 |

*Primary Examiner*—Judy M. Reddick
*Attorney, Agent, or Firm*—John A. Brady

[57] ABSTRACT

A charge roller has a steel shaft and conductive outer cylindrical body which is formed by curing with heat a blend comprised of epichlorohydrin rubber, mineral-oil-free zinc oxide dispersion, stearic acid as a lubricant, accelerators and a sulfur donor. The roller has a long useful life and does not express oil while inactive.

21 Claims, No Drawings

CHARGE ROLLER

TECHNICAL FIELD

This invention relates to electrostatic imaging. More specifically, this invention relates to an improved composition of the outer body of a charge roller.

BACKGROUND OF THE INVENTION

As is now widely conventional in xerographic systems, a photoconductive (PC) drum or belt is charged and then partially discharged to form an electrostatic image. Since contact charging produces little environmental ozone, it is frequently employed as the manner of charging.

A previous contact charging roller which is now prior art to this invention was effective for its purpose since the charge roller was in the cartridge (15,000 average page life) and therefore did not require functioning over the full life of the printer (250,000 average page life). Also, the operating speed of the PC drum was up to 16 pages per minute, while the roller of this invention will operate at up to 24 pages per minute.

Life testing of that prior art charge roller showed loss of ability to charge a photoconductor drum over a 250,000 page life test. Typically, a new charge roller was capable of charging the photoconductor drum to a voltage of 900 v, while at end-of-life the prior charge roller was capable of charging the drum to 500 v. Ideally the charge voltage would remain constant at 900 v. The decrease in charge voltage was primarily due to a gradual increase in the resistance of the charge roller over the life of the test. The typical nip resistance of the roller at the start of life was 1 mega ohm while typical resistance at the end of life was 50 mega ohms.

This gradual increase in resistance over life, termed electrical fatigue, is very undesirable to the operation of a long-life charge roller. A reduction in the rate of resistance increase greatly improves the performance of the charge roller over life of operation.

Additionally, the prior art formula contained zinc oxide added as a dispersion in mineral oil. Where the charge roll is under pressure, as when mounted in a cartridge in contact with a photoconductor drum, the oil has been found to be a contaminant.

DISCLOSURE OF THE INVENTION

This charge roller comprises a conductive core, typically a steel shaft, and a compliant, conductive or semiconductive cylindrical body mounted on the core. In accordance with this invention, the body is the product of curing a mixture of epichlorohydrin rubber, zinc oxide, an organic lubricant, accelerators and a sulfur donor in the absence of elemental sulfur significant to crosslinking the rubber. The zinc oxide is in the form of a powder or in the form of a dispersion in a rubber, thereby eliminating oil which can be expressed out and briefly interfere with imaging performance.

BEST MODE FOR CARRYING OUT THE INVENTION

The following Table 1 gives the trade name, chemical name, purpose, and supplier for all ingredients for the two formulas.

TABLE 1

| Trade Name | Chemical Name | Purpose | Supplier |
|---|---|---|---|
| Hydrin T65 | Epichlorohydrin rubber, 2.4 mole % allyl glycidyl ether (AGE), 48.8 mole % ethylene oxide (EO), 48.8 mole % epichlorohydrin (ECH), Mooney viscosity 65 (ML 1' + 4' @ 100 C.). | Semi-conductive rubber | Zeon |
| Hydrin 3100 | Epichlorohydrin rubber, 8.0 mole % AGE, 25 mole % EO, 67 mole % ECH, Mooney viscosity 72 (ML 1' + 4' @ 100 C.). | Semi-conductive rubber | Zeon |
| Stearic Acid | Stearic Acid | Lubricant, activator | (multiple) |
| RHENOGRAN ZnO 85 SG | Zinc oxide (ZnO) dispersion, French process grade, very fine particle size, 85% active, dispersed in ethylene propylene diene monomer rubber (EPDM) | Activator | Rhein Chemie |
| ELASTOZINC | Zinc oxide dispersion in mineral oil, 90% active | Activator | Elastochem |
| ALTAX | Mercaptobenzothiazole disulfide (MBTS) powder | Accelerator | RT Vanderbilt |
| UNADS | Tetramethylthiuram monosulfide (TMTM) powder | Accelerator | RT Vanderbilt |
| V (MT) D-75 | Tetramethylthiuram disulfide (TMTD) dispersion, 75% active | Accelerator and Crosslinker | Rhein Chemie |
| METHYL ZIMATE PELFORM | Zinc dimethyldithiocarbamate (ZDMC) dispersion, 75% active | Accelerator and Crosslinker | RT Vanderbilt |
| E(SR)D-75 | Dithiodimorpholine (DTDM) dispersion, 75% active | Crosslinker | Rhein Chemie |
| PB(RM-S)-80 | Rubbermaker's sulfur dispersion, 80% active | Crosslinker | Elastochem |

A comparison between the prior art formula improved by this invention and this invention is as follows in Table 2. The ingredient amounts are in parts by weight.

TABLE 2

| Ingredient | New Hydrin Formulation | Prior Art Formulation | Purpose |
|---|---|---|---|
| Hydrin T65 | 90 | 90 | Rubber |
| Hydrin 3100 | 10 | 10 | Rubber |
| RHENOGRAN ZnO 85 SG | 5 | 0 | Activator |
| ELASTOZINC | 0 | 5 | Activator |
| Stearic Acid | 1 | 1 | Lubricant and Activator |
| ALTAX | 1.00 | 1.00 | Accelerator |
| UNADS | 0.40 | 0.40 | Accelerator |
| V(MT)D-75 | 0 | 0.53 | Accelerator and Crosslinker |
| METHYL ZIMATE PELFORM | 1.60 | 0 | Accelerator and Crosslinker |
| E(SR)D-75 | 1.75 | 0 | Crosslinker |
| PB(RM-S)-80 | 0 | 0.63 | Crosslinker |
| Total | 110.75 | 108.56 | |

The epichlorohydrin rubbers used in this invention are terpolymers of epichlorohydrin, ethylene oxide, and allyl glycidyl ether. These monomers are arranged randomly in the polymer chain. The illustrative structure is shown below, with the epichlorohydrin moiety (left) being in a randomly dispersed amount x, the AGE moiety (center) being in a randomly dispersed amount y, and the ethylene oxide moiety (right) being in a randomly dispersed amount z.

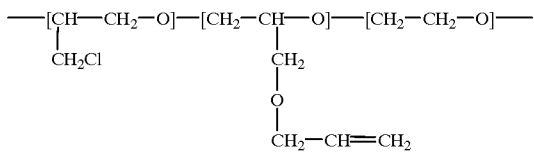

The various grades of epichlorohydrin rubber differ in the molar percentages of the three monomers x, y, and z in the above structure. The values of x, y, and z for Hydrin T65 and Hydrin 3100 are indicated in Table 1 above.

Higher EO content will make the polymer more conductive and higher AGE will make the polymer more compression-set-resistant. In the current formula it was necessary to blend two grades of the rubber to achieve the desired levels of EO and AGE since a single grade with the desired levels was not commercially available.

The RHEONGRAN ZnO 85 SG replaces the ELASTOZINC to eliminate the small amount of oil used as a binder in the ELASTOZINC (the RHEONGRAN has a rubbery polymer binder). This eliminates the bleeding of oil under prolonged pressure, which causes a minor, temporary print defect when the oil is on the photoconductor.

The use of the sulfur donor DTDM and the use of either TMTD or ZDMC accelerator are effective in reducing the electrical fatigue.

Magnesium oxide is believed to be an alternative activator to zinc oxide, but much slower.

The use of dispersions is a processing convenience since dispersions are easier to handle than loose powders. They also make the mixing action more efficient in achieving good dispersion of the active ingredient into the mix. Powders and dispersions will both effect the same final properties of the cured rubber.

The rubber is blended using a two-roll mill or an internal mixer. The ingredients are typically added in the order listed in the formula and thoroughly blended before the next ingredient is added. The rubber is molded in cylindrical form around a steel shaft in a heated press and cured for approximately 15 minutes at 320F. This processing is the same as that of the foregoing prior art roller of Table 2.

The cured rubber has the following properties:

| | | |
|---|---|---|
| Hardness: | 38 +/− 5 Shore A | (ASTM D2240) |
| Compression Set: | Less than 12% | (ASTM D395, 22 hrs., Method B, 70 C.) |

Alternatives and variations can be anticipated. Accordingly, patent protection as provided by law is sought, with particular reference to the accompanying claims.

We claim:

1. A charge roller comprising a conductive core and an outer cylindrical body around said core which is the product of the following ingredients thoroughly mixed and cured by heat, said curing being in the absence of elemental sulfur significant to said curing: epichlorohydrin rubber, organic acid lubricant, metal oxide activator, accelerator and sulfur donor.

2. The charge roller as in claim 1 in which said sulfur donor is dithiodimorpholine.

3. The charge roller as in claim 1 in which said activator is zinc oxide.

4. The charge roller as in claim 3 in which said sulfur donor is dithiodimorpholine.

5. The charge roller as in claim 4 in which said accelerator comprises a zinc dimethyldithiocarbamate dispersion.

6. The charge roller as in claim 1 in which said accelerator comprises a zinc dimethyldithiocarbamate dispersion.

7. The charge roller as in claim 2 in which said accelerator comprises a zinc dimethyldithiocarbamate dispersion.

8. The charge roller as in claim 3 in which said accelerator comprises a zinc dimethyldithiocarbamate dispersion.

9. The charge roller as in claim 5 in which with respect to said mixed ingredients: said lubricant is about 1 part by weight stearic acid, said rubber is about 100 parts by weight, said accelerator except for said zinc dimethyldithiocarbamate is about 1.40 parts by weight, said zinc dimethyldithiocarbamate is a 75% active dispersion of about 1.60 parts by weight, said dithiodimorpholine is a 75% active dispersion of about 1.75 parts by weight, and said zinc oxide activator is an 85% active dispersion in rubber of about 5 parts by weight.

10. The charge roller as in claim 1 in which said metal oxide activator is a dispersion in rubber.

11. The charge roller as in claim 2 in which said metal oxide activator is a dispersion in rubber.

12. The charge roller as in claim 3 in which said zinc oxide activator is a dispersion in rubber.

13. The charge roller as in claim 4 in which said zinc oxide activator is a dispersion in rubber.

14. The charge roller as in claim 5 in which said sulfur donor is dithiodimorpholine.

15. The charge roller as in claim 6 in which said sulfur donor is dithiodimorpholine.

16. The charge roller as in claim 7 in which said sulfur donor is dithiodimorpholine.

17. The charge roller as in claim 8 in which said sulfur donor is dithiodimorpholine.

18. A charge roller comprising a conductive core and an outer cylindrical body around said core which is the product of the following ingredients thoroughly mixed and cured with sulfur by heat: epichlorohydrin rubber, organic acid lubricant, metal oxide activator dispersed in rubber, accelerator and sulfur donor.

19. The charge roller as in claim 18 in which said accelerator comprises a zinc dimethyldithiocarbamate dispersion.

20. The charge roller as in claims 19 in which said activator is zinc oxide.

21. The charge roller as in claim 18 which said activator is zinc oxide.

* * * * *